(12) United States Patent
Yamasaki et al.

(10) Patent No.: US 6,588,292 B2
(45) Date of Patent: Jul. 8, 2003

(54) TRANSMISSION INCLUDING CLUTCH AND SHAFT DRIVING DEVICE

(75) Inventors: Masaru Yamasaki, Chiyoda (JP); Tadahiko Nogami, Mito (JP); Hiroshi Kuroiwa, Hitachi (JP); Naoyuki Ozaki, Hitachinaka (JP); Toshimichi Minowa, Mito (JP); Takashi Okada, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/919,892

(22) Filed: Aug. 2, 2001

(65) Prior Publication Data

US 2002/0129671 A1 Sep. 19, 2002

(30) Foreign Application Priority Data

Mar. 15, 2001 (JP) .......................... 2001-73281

(51) Int. Cl.$^7$ .............................................. F16H 03/38
(52) U.S. Cl. ............................................. 74/340; 74/339
(58) Field of Search ................................. 74/339, 340

(56) References Cited

U.S. PATENT DOCUMENTS

| | | | | |
|---|---|---|---|---|
| 5,125,282 A | * | 6/1992 | Bender et al. | 74/333 |
| 5,181,431 A | * | 1/1993 | Zaiser et al. | 192/48.8 |
| 5,890,392 A | * | 4/1999 | Ludanek et al. | 74/331 |
| 5,950,781 A | * | 9/1999 | Adamis et al. | 192/3.61 |
| 6,095,001 A | * | 8/2000 | Ruehle et al. | 74/331 |
| 6,364,809 B1 | * | 4/2002 | Cherry | 477/176 |
| 6,427,550 B1 | * | 8/2002 | Bowen | 74/331 |

OTHER PUBLICATIONS

Japanese Patent Unexamined Publication No. 11-264449.
Japanese Patent Unexamined Publication No. 61-45163.
7$^{th}$ LuK Symposium Apr. 11./12., 2002—No. 13 "The XSG Family" pp. 145–160.

* cited by examiner

Primary Examiner—Richard M. Lorence
Assistant Examiner—Dennis Abdelnour
(74) Attorney, Agent, or Firm—Antonelli, Terry, Stout & Kraus, LLP (57) ABSTRACT

In a transmission with a first clutch including a first upstream rotary member to be driven by an input shaft, and a first downstream rotary member to be driven by the first upstream rotary member to drive an output shaft so that the first upstream and downstream rotary members are adapted to be selectively engaged with each other and disengaged from each other, an output shaft driving device includes a second upstream rotary member to be driven by the input shaft, and a second downstream rotary member to be driven by the second upstream rotary member to drive the output shaft.

19 Claims, 7 Drawing Sheets

TRANSMISSION INCLUDING CLUTCH AND SHAFT DRIVING DEVICE

BACKGROUND OF THE INVENTION AND RELATED ART STATEMENT

The present invention relates to a transmission for transmitting a torque from an input shaft to an output shaft.

JP-A-11-264449 discloses a transmission including coaxial input and output shafts, a bypass torque path for transmitting a torque from the input shaft to the output shaft through an intermediate shaft extending parallel to the coaxial input and output shafts and two gear trains, and a pair of input clutches one of which transmits the torque from the input shaft to the output shaft through selected one of gear pairs of respective shift stages, and another one of which transmits the torque from the input shaft to the output shaft without changing a rotational speed between the input and output shafts.

JP-A-61-45163 discloses a transmission in which a torque is transmitted from an input shaft to an output shaft during a shifting operation through the last shift stage (smallest reduction ratio shift stage) gear pair.

OBJECT AND SUMMARY OF THE INVENTION

An object of the present invention is to provide a transmission in which an engage and/or disengage between an input shaft and an output shaft can be carried out while restraining an abrupt change in torque transmitted therebetween.

In a transmission comprising, an input shaft, an output shaft, and a first clutch including a first upstream rotary member rotationally connected to the input shaft to be driven by the input shaft, and a first downstream rotary member to be driven by the first upstream rotary member and rotationally connected to the output shaft to drive the output shaft and to be driven by the output shaft, wherein the first upstream and downstream rotary members are adapted to be selectively engaged with each other and disengaged from each other, the transmission further comprises, an output shaft driving device for applying a torque to the output shaft at least when the first upstream and downstream rotary members are disengaged from each other. The output shaft driving device may includes a second upstream rotary member to be driven by the input shaft and a second downstream rotary member to be driven by the second upstream rotary member to drive the output shaft so that the torque transmitted by the output shaft driving device from the second upstream rotary member to the second downstream rotary member is variably adjustable by changing a slipping or attracting degree (torque transmitting degree) between the second upstream and downstream rotary members when a rotational speed of the output shaft is smaller than that of the input shaft, or the output shaft driving device may be an electric motor for applying the torque to the output shaft.

By the output shaft driving device, an engage and/or disengage through the first clutch between the input shaft and the output shaft can be carried out while restraining an abrupt change in torque transmitted therebetween.

It is preferable for restraining the abrupt change in torque transmitted between the output and input shafts that the first upstream and downstream rotary members are disengaged from each other after the torque applied by the output shaft driving device to drive the output shaft is gradually increased, that the torque transmitted by the output shaft driving device to drive the output shaft is decreased after the first upstream and downstream rotary members are engaged with each other, that the torque applied by the output shaft driving device to the output shaft is adjusted in such a manner that a difference in rotational speed between the first upstream and downstream rotary members is kept within a predetermined range just before the first upstream and downstream rotary members are engaged with each other, and/or that the torque applied by the output shaft driving device to the output shaft is adjusted in such a manner that a difference in rotational speed between the first upstream and downstream rotary members just after the first upstream and downstream rotary members are disengaged from each other is kept within a predetermined range (a difference between the torque applied by the output shaft driving device just after the first upstream and downstream rotary members are disengaged from each other and the torque transmitted between the input shaft and the output shaft just before the first upstream and downstream rotary members are disengaged from each other is kept within a predetermined range).

When the transmission further comprises, a counter shaft through which the first clutch is rotationally connected to the output shaft to be driven by the input shaft so that the first upstream rotary member is driven by the input shaft, the first downstream rotary member is driven by the first upstream rotary member to drive the output shaft through the counter shaft, and the first downstream rotary member is driven by the output shaft through the counter shaft, a pair of first and second gears, the first gear being adapted to be driven by the counter shaft, the second gear being adapted to be driven by the first gear to drive the output shaft, and the first and second gears mating with each other, and a second clutch including a second shaft-side rotary member rotationally fixed to one of the counter shaft and the output shaft, and a second gear-side rotary member rotationally fixed to one of the first and second gears in such a manner that the input shaft is permitted to be rotationally connected to the output shaft through the second shaft-side and gear-side rotary members and the pair of first and second gears, so that the second shaft-side rotary member is adapted to be selectively engaged with the second gear-side rotary member and disengaged from the second gear-side rotary member, it is preferable for restraining the abrupt change in torque transmitted between the output and input shafts that the torque applied by the output shaft driving device to the output shaft is adjusted in such a manner that a difference in rotational speed between the second shaft-side and gear-side rotary members obtainable when the first upstream and downstream rotary members are engaged with each other is kept within a predetermined range just before the second shaft-side and gear-side rotary members are engaged with each other, that the torque applied by the output shaft driving device to the output shaft is adjusted in such a manner that a difference in rotational speed between the second shaft-side and gear-side rotary members just after the second shaft-side and gear-side rotary members are disengaged from each other is kept within a predetermined range (a difference between the torque applied by the output shaft driving device just after the second shaft-side and gear-side rotary members are disengaged from each other and the torque transmitted between the input shaft and the output shaft just before the second shaft-side and gear-side rotary members are disengaged from each other is within a predetermined range is kept within a predetermined range), that the torque applied by the output shaft driving device to the output shaft is adjusted in such a manner that a difference in rotational speed between the first upstream and downstream rotary members obtained after the second shaft-side rotary member is engaged with the second gear-side rotary member is kept within a predetermined range just before the first upstream and downstream rotary members are engaged with each other, that the second shaft-side rotary member is disengaged from the second gear-side rotary member after the first upstream and downstream rotary members are disengaged from each other, that the torque applied by the output shaft driving device to the output shaft is gradually increased before the second shaft-side rotary member is disengaged from the second gear-side rotary member, and/or that the torque applied by the output shaft driving device to the output shaft is decreased after the first upstream and downstream rotary members are engaged with each other while the second shaft-side rotary member is kept engaged with the second gear-side rotary member.

When the transmission further comprises, another pair of first and second gears, the first gear being adapted to be driven by the counter shaft, the second gear being adapted to be driven by the first gear to drive the output shaft, the first and second gears mating with each other, and a reduction gear ratio of the pair of first and second gears being larger than that of the another pair of first and second gears, and a third clutch including a third shaft-side rotary member rotationally fixed to one of the counter shaft and the output shaft, and a third gear-side rotary member rotationally fixed to one of the first and second gears of the another pair so that the input shaft is rotationally connected to the output shaft through the third shaft-side and gear-side rotary members and the another pair of first and second gears, wherein the third shaft-side rotary member is adapted to be selectively engaged with the third gear-side rotary member and disengaged from the third gear-side rotary member, and the second clutch and third clutch are cooperative in such a manner that the third shaft-side rotary member is engaged with the third gear-side rotary member when the second shaft-side rotary member is disengaged from the second gear-side rotary member and the third shaft-side rotary member is disengaged from the third gear-side rotary member when the second shaft-side rotary member is engaged with the second gear-side rotary member, it is preferable for restraining the abrupt change in torque transmitted between the output and input shafts that the torque applied by the output shaft driving device to the output shaft is gradually increased before the third shaft-side rotary member is engaged with the third gear-side rotary member after the second shaft-side rotary member is disengaged from the second gear-side rotary member, and/or that the torque applied by the output shaft driving device to the output shaft is adjusted in such a manner that a difference in rotational speed between the third shaft-side rotary member and the third gear-side rotary member obtainable when the first upstream and downstream rotary members are engaged with each other is kept within a predetermined range just before the third shaft-side rotary member is engaged with the third gear-side rotary member.

A peripheral total number of teeth of the first gear of the another pair may be smaller than that of the second gear of the another pair so that a rotational speed of the output shaft is lower than that of the input shaft.

When a peripheral total number of teeth of the first gear of the another pair is larger than that of the second gear of the another pair so that a rotational speed of the output shaft is higher than that of the input shaft, it is preferable for restraining the abrupt change in torque transmitted between the output and input shafts that the output shaft driving device includes a one-way clutch for transmitting the torque through the output shaft driving device when the rotational speed of the output shaft is lower than that of the input shaft and preventing the torque from being transmitted through the output shaft driving device when the rotational speed of the output shaft is higher than that of the input shaft.

It is preferable for speedy rotational speed control of the counter shaft that the first upstream and downstream rotary members are engaged temporarily with each other to decrease a difference in rotational speed between the first upstream and downstream rotary members while increasing the torque applied by the output shaft driving device to the output shaft, before the third shaft-side and gear-side rotary members are engaged with each other after the second shaft-side rotary member is disengaged from the second gear-side rotary member after the first upstream and downstream rotary members are disengaged from each other.

It is preferable that a radial inside of at least a part of the counter shaft while being prevented from including a gear train between the output shaft driving device and the output shaft.

DETAILED DESCRIPTION OF PREFERRED EMBODIMENTS

Figure 1:
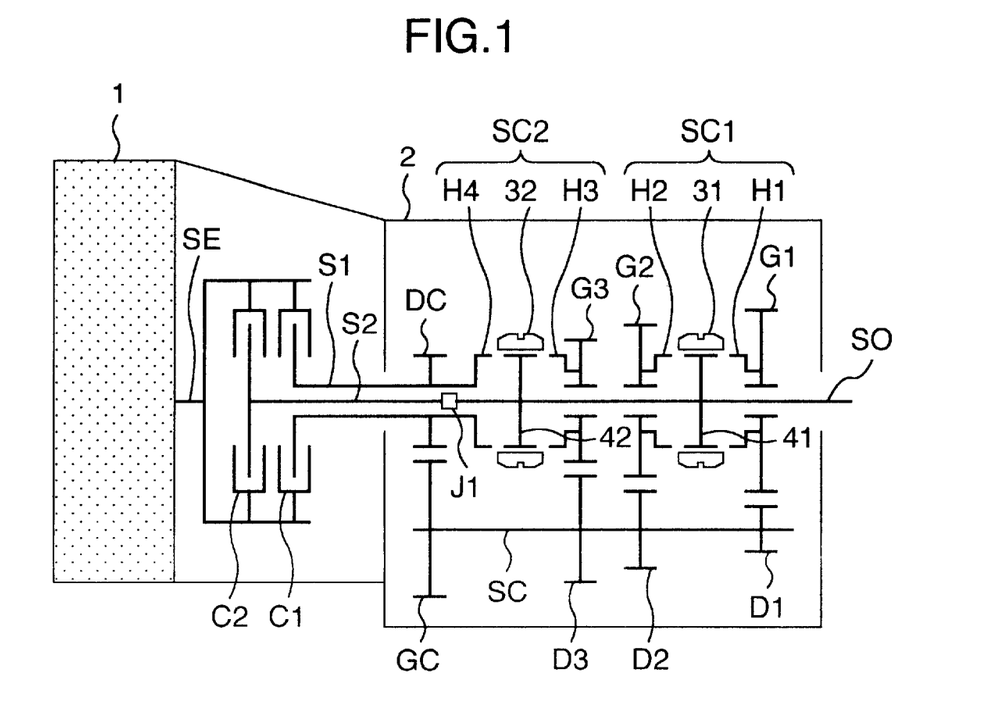
FIG. 1 is a view schematically showing an embodiment of the present invention.

FIG. 1 is a view schematically showing an embodiment of a four-shift-stages transmission as an example of the invention.

In FIG. 1, a drive source 1 is an engine. A first clutch C1 and a second clutch C2 are connected to an output shaft SE of the drive source 1. An input shaft of a transmission 2 include a first input shaft S1 and a second input shaft S2 connected respectively through the first clutch C1 and the second clutch C2 to the output shaft SE. The first input shaft S1 has a hollow shape, the second input shaft S2 is arranged at a radial inside of the first input shaft S1 or surrounded by the first input shaft S1, and the first input shaft S1 is connected to the first clutch C1. The second input shaft S2 is connected to the second clutch C2.

In this case, in FIG. 1, a mechanism for operating the respective clutches is not illustrated, however, an engaging and disengaging operation can be executed by an external operation.

That is, when the first clutch C1 is engaged, a torque output from the output shaft SE of the drive source 1 is transmitted to the first input shaft S1 of the transmission, and when the second clutch C2 is engaged, the torque output from the output shaft SE of the drive source 1 is transmitted to the second input shaft S2 of the transmission.

The transmission 2 is a synchromesh transmission similar to a conventional transmission for a manual shift, and is differentiated therefrom by the second input shaft S2 directly connected to a transmission output shaft SO through a joint portion J1 without any gear train between the second clutch C2 and the transmission output shaft SO. FIG. 1 is a transmission mechanism shiftable between a first shift stage and a fourth shift stage.

The transmission 2 includes the first input shaft S1, the second input shaft S2, a counter shaft SC, the transmission output shaft SO, a plurality of shift-stage pairs of gears mounted respectively onto the transmission output shaft SO and the counter shaft SC in each pair, and a first gear shift clutch SC1 and a second gear shift clutch SC2 for changing a torque transmitting path in accordance with a desired shift stage.

The counter shaft SC is rotated by a torque transmitted from the first input shaft S1 through a counter drive gear DC to a counter driven gear G0. Further, a first shift stage drive gear D1 and a first shift stage driven gear G1 are used for the first shift stage, a second shift stage drive gear D2 and a second shift stage driven gear G2 are used for a second shift stage and a third shift stage drive gear D3 and a third shift stage driven gear G3 are used for a third shift stage, between the counter shaft SC and the transmission output shaft SO. Each of the driven gears G1-3 is rotatable on the transmission output shaft. Each of the drive gear D1-3 is fixed to the counter shaft SC. Each of the first gear shift clutch SC1 and the second gear shift clutch SC2 is used to fix rotationally one of the driven gears G1-3 and spline H4 to the transmission output shaft. Sleeves 31 and 32 movable in an axial direction respectively on the hubs 41 and 42 while being rotationally fixed to respectively the hubs 41 and 42 are provided within the respective gear shift clutches SC1 and SC2, and splines are formed in the sleeves 31 and 32 respectively. The splines engage respectively with the hubs 41 and 42 fixed to the transmission output shaft so as to transmit the torque. Other splines are formed on the driven gears, and in the case that the sleeves are at neutral positions, the sleeves 31 and 32 are not in an engaging state with the splines H1, H2 and H3 of the driven gears and the spline H4 of the first input shaft, so that the driven gears and the first input shaft are freely rotatable with respect to the transmission output shaft. When moving the sleeve in the axial direction, one of the splines H1, H2 and H3 of the driven gears or the spline H4 of the first input shaft engages with the spline on the sleeve 31 or 32 while the sleeve engages with the hub 41 or 42, so that one of the driven gears or the first input shaft is fixed rotationally to the transmission output shaft. Further, a synchromesh mechanism for synchronizing the rotations of the one of the splines H1, H2 and H3 of the driven gears or the spline H4 of the first input shaft and the spline on the sleeve 31 or 32 when a difference in rotational speed therebetween exists may be assembled in the gear shift clutch. Further, a mechanism for moving the sleeves is not illustrated.

When the shift stage is changed, the sleeve 31 of the first gear shift clutch SC1 or the sleeve 32 of the second gear shift clutch SC2 is operated so as to be engaged with the one of the spline H1, H2 and H3 of the first input shaft or the spline H4 of the first input shaft in accordance with the desired shift stage, so that the selected driven gear or the first input shaft is fixed rotationally to the transmission output shaft So, whereby a torque transmission path is formed. In the fourth shift stage, the spline H4 for the fourth shift stage is directly connected to the first input shaft S1, so that the first input shaft S1 and the transmission output shaft SO are directly connected to each other without any gear train.

Although the driven gear on the transmission output shaft SO is equipped with the gear shift clutch in the above case, at least one of the first gear shift clutch SC1 and the second gear shift clutch SC2 may be mounted on the drive gear on the counter shaft SC, and further, in order to provide more transmission gear ranges, more gear shift clutches and more gears for constructing the transmission gear ranges may be provided.

Figure 2:
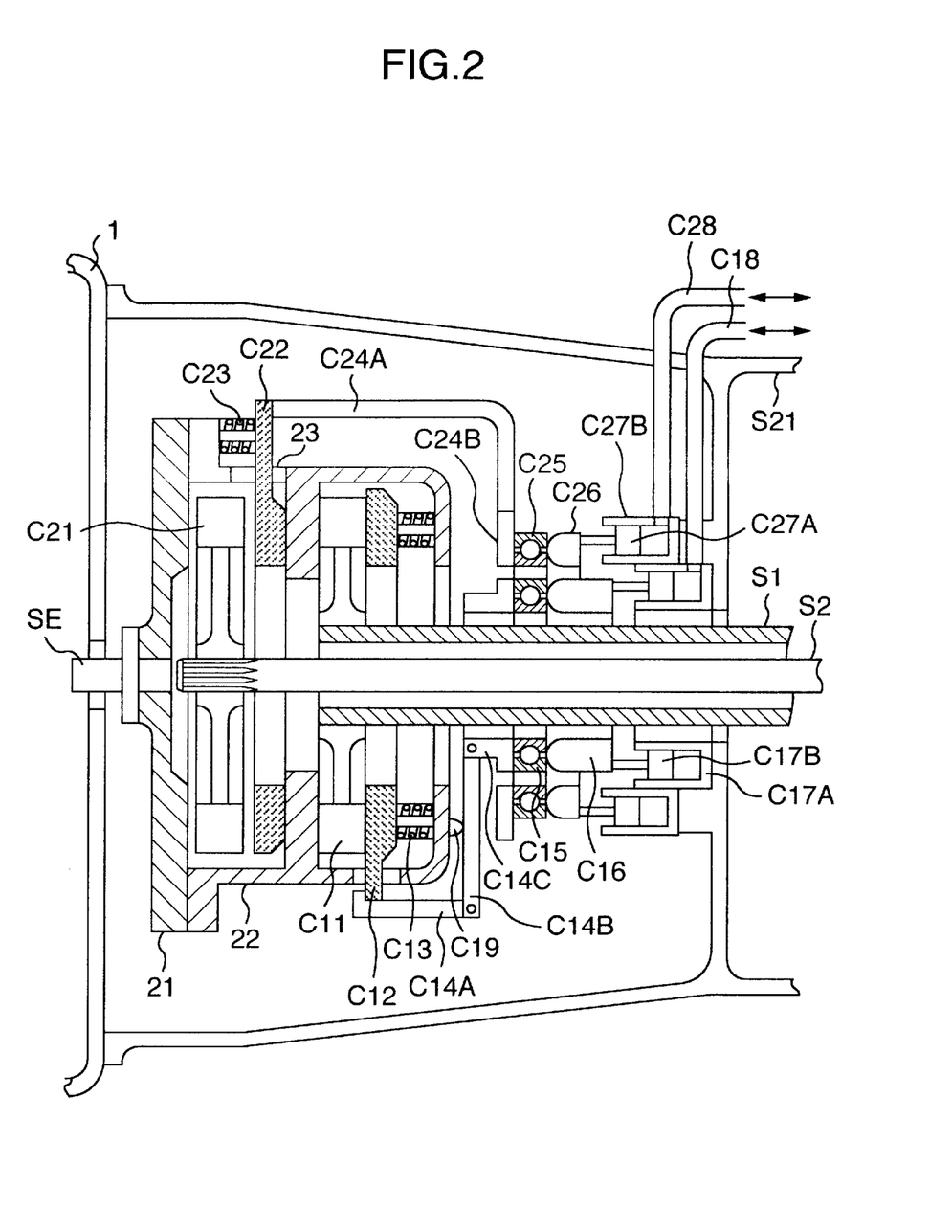
FIG. 2 is a view showing in details a first clutch C1 and a second clutch C2 in the embodiment shown in FIG. 1.

FIG. 2 shows details of the first clutch C1 and the second clutch C2.

In FIG. 2, the output shaft SE of the drive source 1 is connected to a flywheel 21, and a clutch cover 22 is fixed onto the flywheel 21. Further, a first pressure plate C12 and a second pressure plate C22 are rotationally fixed to the flywheel 21 and are freely movable in an axial direction. A clutch disc C11 of the first clutch is arranged between the clutch cover 22 and the first pressure plate C12, and a clutch disc C21 of the second clutch is arranged between the flywheel 21 and the second pressure plate C22. A first clutch spring C13 urges the first pressure plate C12 toward the clutch cover 22, and a second clutch spring C23 urges the second pressure plate C22 away from the flywheel 21. The first clutch disc C11 is rotationally fixed to the first input shaft S1 while being movable in the axial direction, and the second clutch disc C22 is rotationally fixed to the second input shaft S2 while being movable in the axial direction.

The first pressure plate C12 is connected to a first release bearing C15 via a first clutch first operating link C14A, a first clutch second operating link C14B and a first clutch third operating link C14C. An operating force of the clutch is output by a hydraulic cylinder mechanism including a first release cylinder C17B and a first release piston C17A, and a pressure within the cylinder is adjusted from an external portion via a first hydraulic pipe C18. In this case, since the first clutch first operating link C14A, the first clutch second operating link C14B and the first clutch third operating link C14C for operating the first pressure plate C12 are mounted to the clutch cover 22 so that they rotate together with the flywheel 21, and the hydraulic cylinder mechanism for generating the operating force is mounted to a transmission body not rotatable, the first release bearing C15 is arranged between the first clutch third operating link C14C and the first release bearing holder C16 to absorb a relative rotational therebetween.

When a high pressure is supplied to the hydraulic cylinder mechanism of the first clutch C1 from an external portion, the first release piston is pressed out (moved in a left direction in the drawing), so as to press the first release bearing holder C16, the first release bearing C15 and the first clutch third operating link C14C. Since the first clutch third operating link C14C is connected to the first clutch second operating link C14B rotatably around a pivot C19, the first clutch second operating link C14B draws the first clutch first operating link C14A (moves in a right direction in the drawing). When the first clutch first operating link C14A is drawn by the first clutch second operating link C14B, the first pressure plate C12 releases a pressing of the first clutch disc C11, and the first clutch is disengaged. Further, when the pressure is not applied to the hydraulic cylinder mechanism of the first clutch from the external portion, a force of the first clutch spring C13 presses the first clutch disc C11 against the clutch cover 22 through the first pressure plate C12 presses, whereby the first clutch is engaged.

The second pressure plate C22 is connected to a second release bearing C25 via a second clutch first operating link C24A and a second clutch second operating link C24B. An operating force of the clutch is output by a hydraulic cylinder mechanism including a second release cylinder C27B and a second release piston C27A, and a pressure within the cylinder is adjusted from an external portion via a second hydraulic pipe C28. In this case, since the second clutch first operating link C24A and the second clutch second operating link C24B for operating the second pressure plate C22 are mounted to the clutch cover 22, they rotate together with the flywheel 21. Since the hydraulic cylinder mechanism for generating the operating force is mounted to the transmission body, it does not rotate, and the second release bearing C25 is arranged between the second clutch second operating link C24B and the second release bearing holder C26 to absorb a relative rotational motion therebetween. In the case that a high pressure is supplied to the hydraulic cylinder mechanism of the second clutch from the external portion, the second release piston is projected out (moved in a left direction in the drawing), so as to press the second release bearing holder C26, the second release bearing C25 and the second clutch second operating link C24B. The second clutch second operating link C24B is connected to the second clutch first operating link C24A, and the second clutch first operating link C24A is also pressed (moved in a left direction in the drawing).

When the second clutch first operating link C24A is pressed, the second pressure plate C22 presses the second clutch disc C21 toward the flywheel 21, and the second clutch is engaged. Further, when the pressure is not applied to the hydraulic cylinder mechanism of the second clutch supplied from the external portion, the second pressure plate C22 moves apart from the flywheel 21 due to a force of the second clutch spring C23, and cancels the pressing state of the second clutch disc C21, whereby the second clutch is disengaged.

In an operation of a shift up, for example, the first shift stage is changed to the second shift stage. At the first shift stage, the first sleeve 31 of the first gear shift clutch SC1 is positioned on a first shift stage driven gear and is engaged with the spline H1 of the first shift stage driven gear. The first clutch C1 is in an engaging state and the second clutch C2 is in a disengaged state.

Figure 3:
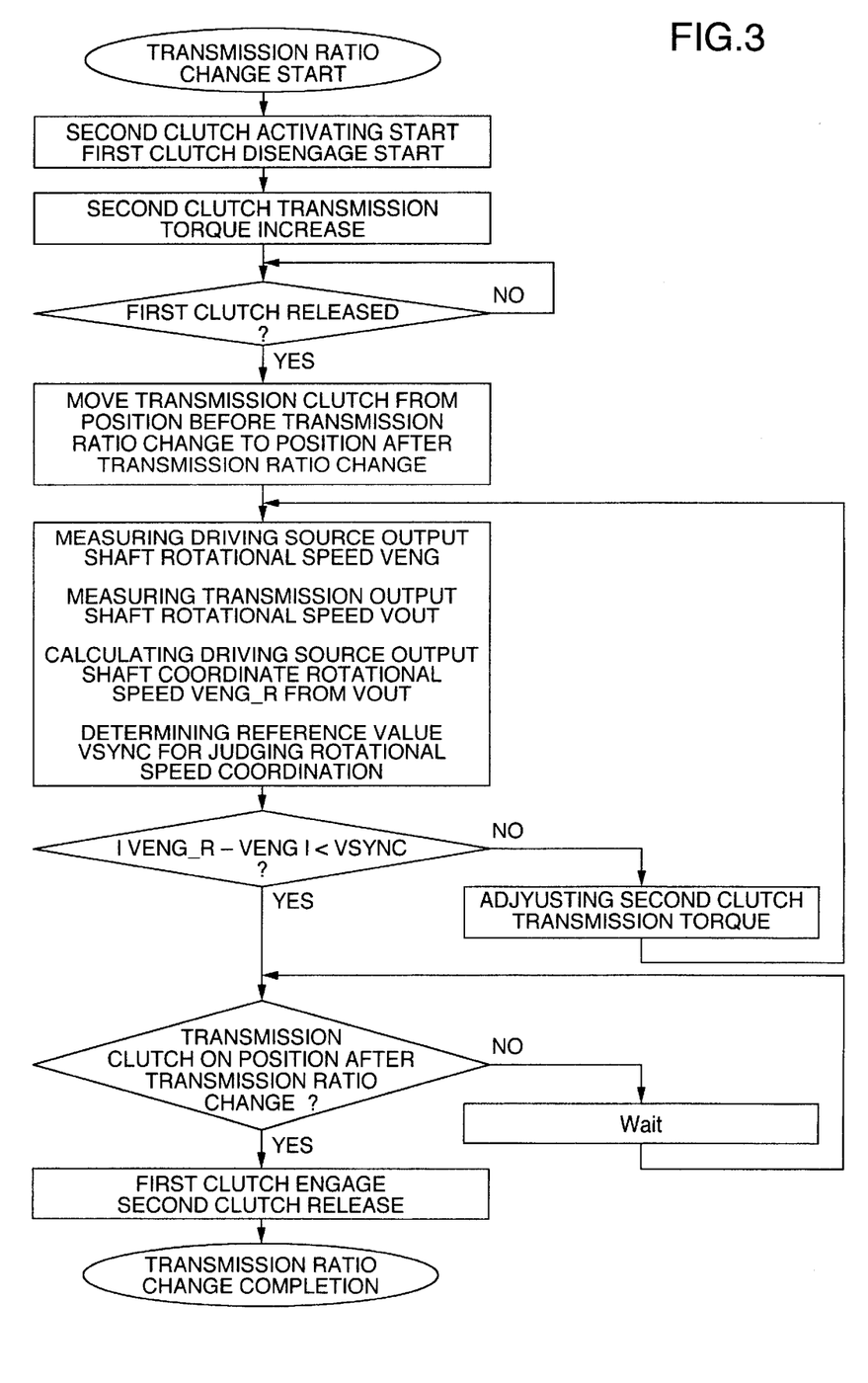
FIG. 3 is a flow chart of a shift up operation in the embodiment shown in FIG. 1.

FIG. 3 shows a flow chart at a time of shifting up.

In FIG. 3, when a shift operation is started, the second clutch is set in a half clutch state transmitting a torque with slipping or relative rotation between the clutch disc C21 and the flywheel 21, and the first clutch is disengaged while increasing a transmission torque of the second clutch. It is preferable that a disengaging timing of the first clutch is a timing point where a torque transmitted by the second clutch reaches a torque transmitted by the first clutch and the second clutch before the first clutch is disengaged (that is, all or main part of the torque transmitted between the input and output shafts is transmitted by the second clutch although both the first and second clutches are in engaging state) so that the torque applied to the output shaft SO is changed from the torque transmitted by the first clutch C1 to the torque transmitted by the second clutch C2 without a considerable difference therebetween. Immediately after disengaging the first clutch, the first sleeve 31 of the first gear shift clutch SC1 is moved to engage with the spline H2 of the second speed driven gear from the spline H1 of the first speed driven gear. The gradually increasing torque transmitted by the second clutch is adjusted to prevent the transmission torque of the second clutch from becoming excessively large while decreasing a rotational speed of the output shaft SE of the drive source 1 until a difference between a rotational speed VENG of the output shaft SE of the drive source 1 and a target rotational speed VENG_R of the output shaft SE of the drive source 1 is within a predetermined small range, wherein the target rotational speed VENG_R is a rotational speed obtainable if the output shaft SE is connected to the transmission output shaft SO through the first clutch C1, the counter shaft SC, the second speed drive gear D2, the second speed driven gear G2, the spline H2, the sleeve 31 and the hub 41, that is, until a difference between a rotational speed of the sleeve 31 and the hub 41 driven by the second clutch C2 (the rotational speed of the sleeve 31, hub 41 or output shaft SO can be measured by a sensor) and a rotational speed of the spline H2 obtainable if the output shaft SE is connected to the spline H2 through the first clutch C1, the counter shaft SC, the second speed drive gear D2 and the second speed driven gear G2 (the rotational speed of the spline H2 at this stage can be calculated from the measured rotational speed of the output shaft SE under an imaginary condition of that the output shaft SE is connected to the spline H2 through the imaginarily engaged first clutch C1, the counter shaft SC, the second speed drive gear D2 and the second speed driven gear G2) is within a predetermined small range. Further, a rotational speed alignment judging value VSYNC is set on the basis of the traveling state. Here, under this state, the second clutch keeps the half clutch state yet.

When a difference between the rotational speed VENG of the output shaft SE of the drive source 1 and the rotational speed VENG_R of the output shaft SE of the drive source 1 at the second stage calculated from the rotational speed of the transmission output shaft becomes equal to or less than the rotational number alignment judging value VSYNC, that is, the difference between the rotational speed of the sleeve 31 and the hub 41 and the rotational speed of the spline H2 obtainable if the output shaft SE is connected to the spline H2 through the first clutch C1, the counter shaft SC, second speed drive gear D2 and the second speed driven gear G2 is within the predetermined small range (in this condition, the first sleeve 31 of the first gear shift clutch SC1 becomes into engaging with the spline H2 of the second speed driven gear) and the first sleeve 31 of the first gear shift clutch SC1 reaches an engaging position with the spline H2 of the second speed driven gear (in this condition, the rotational speed of the first input shaft Si is determined by the output shaft SO driven by the second clutch C2), that is, when a difference between the rotational speed of the output shaft SE and a rotational speed of the first input shaft S1 obtained after the sleeve 31 engages with the spline H2 while engaging with the hub 41 is made within a predetermined range by adjusting the transmitted torque through the second clutch C2, the second clutch is disengaged and the first clutch is engaged, whereby the shift operation is finished.

Figure 4:
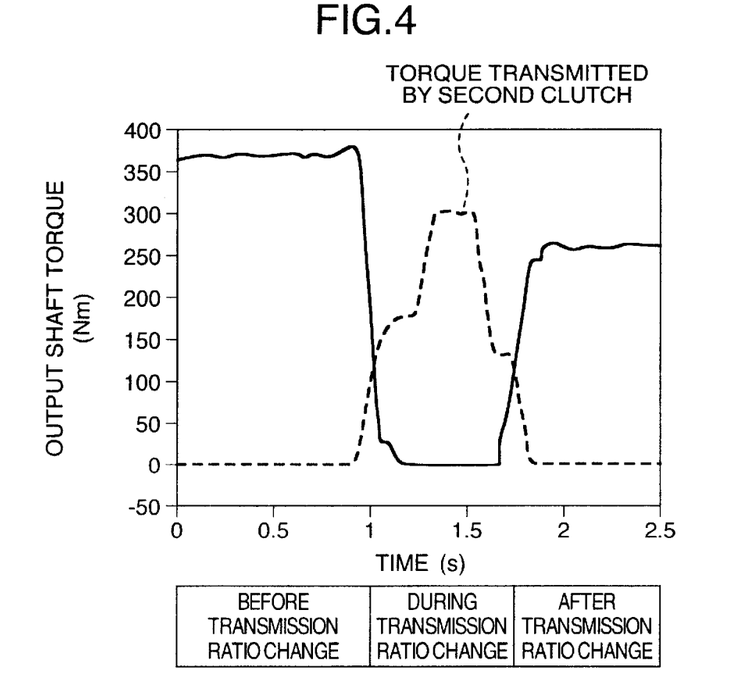
FIG. 4 is a diagram showing variations in torque transmitted by the first and second clutches during a shift operation in the embodiment shown in FIG. 1.
Figure 5:
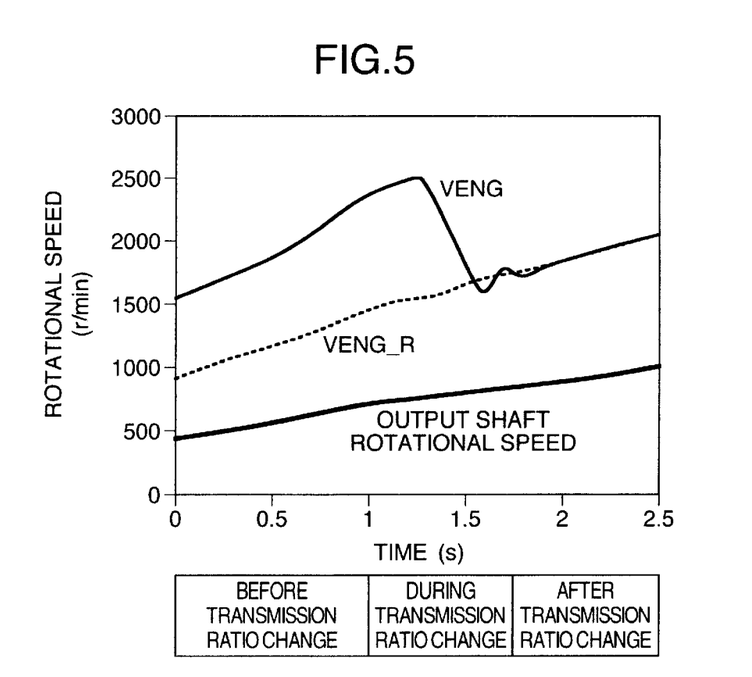
FIG. 5 is a diagram showing variations in rotational speeds of transmission output shaft and engine output shaft, and a variation of an imaginarily calculated first input shaft rotational speed.

FIG. 4 shows the torques transmitted by the first and second clutches to the transmission output shaft SO. FIG. 5 shows variations of drive source output shaft rotational speeds VEG and VENG_R and transmission output shaft rotational speed, and FIG. 6 shows a transmission output shaft torque variation on a shift operation in accordance with the present invention.

Figure 6:
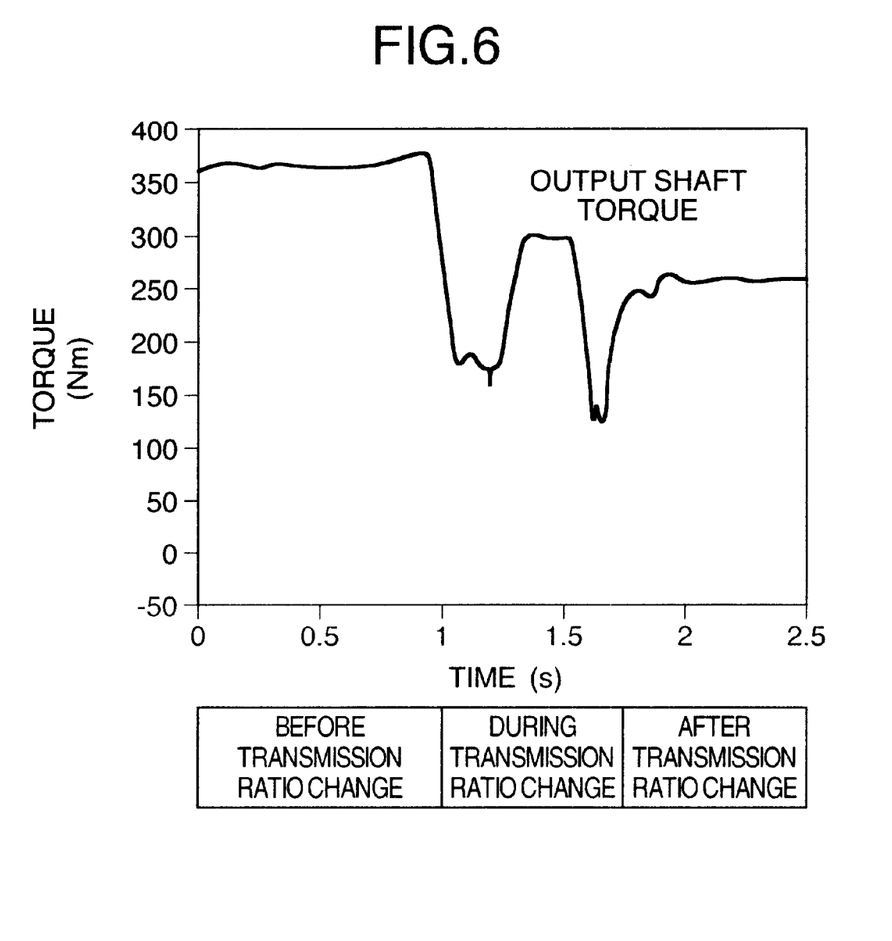
FIG. 6 is a view showing a torque variation of the transmission output shaft during the shift operation in the embodiment shown in FIG. 1.

As is apparent from FIGS. 4, 5 and 6, it is possible to make a mechanism for preventing the torque of the transmission output shaft from being reduced during the shift operation compact and light in weight, it is possible to prevent the torque from being reduced during the shift operation, the torque fluctuations during the shift operation can be suitably controlled by the transmission torque of the second clutch, and it is possible to put a mechanism having an improved controllability into practice. Further, it is possible to provide an automatic transmission which can reduce a shift shock felt by the occupant due to the torque fluctuations during the shift operation by controlling the torque during the shift operation and put a high quality shift operation into practice.

The output of the drive source 1 during the shift operation may be adjusted, for example, by a throttle operation, a delaying operation of an ignition timing or the like the like which are not employed in the present embodiment. Further, for example, when the first shift stage is being changed to the second shift stage, the transmission torque of the second clutch is being adjusted so as to be prevented from becoming too large while increasing the transmission torque of the second clutch to reduce the rotational speed of the output shaft SE of the drive source 1, and the first sleeve 31 of the first gear shift clutch SC1 is in a neutral state in which the first sleeve 31 is engaged neither with the gear for the first shift stage nor with the gear for the second shift stage, a double clutch operation temporarily engaging the first clutch and again disengaging the first clutch may be performed so as to reduce the rotational speed of the first input shaft and the counter shaft, thereby assisting the engaging operation of the first sleeve 31 of the first gear shift clutch with the spline H2 of the second speed driven gear.

Figure 7:
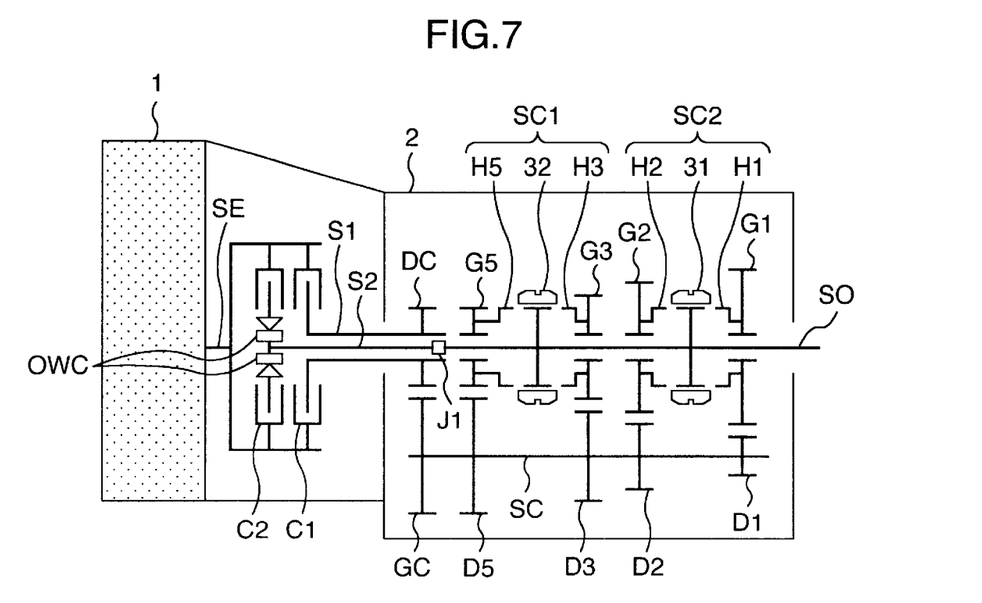
FIG. 7 is a view schematically showing another embodiment of the present invention.

FIG. 7 is a view schematically showing an embodiment of a five-shift-stages transmission as an example of the invention.

In FIG. 7, the second input shaft S2 is connected to the second clutch C2 through a one-way clutch OWC which transmits the torque through the second clutch C2 and the one-way clutch OWC from the second clutch C2 to the second input shaft S2 when the rotational speed of the output shaft SO or the second input shaft S2 is lower than that of the output shaft SE of the drive source 1 as the claimed input shaft and prevents the torque from being transmitted through the second clutch C2 and the one-way clutch OWC when the rotational speed of the output shaft SO or the second input shaft S2 is higher than that of the output shaft SE of the drive source 1 as the claimed input shaft.

The counter shaft SC is rotated by a torque transmitted from the first input shaft S1 through a counter drive gear DC to a counter driven gear GC. Further, a first speed drive gear D1 and a first speed driven gear G1 are used for the first shift stage, a second speed drive gear D2 and a second speed driven gear G2 are used for a second shift stage, a third speed drive gear D3 and a third speed driven gear G3 are used for a third shift stage and a fifth speed drive gear D5 and a fifth speed driven gear G5 are used for a fifth shift stage (for making the rotational speed of the output shaft So larger than that of the output shaft SE), between the counter shaft SC and the transmission output shaft SO. When the sleeves 31 and 32 are at respective neutral positions wherein the sleeves 31 and 32 are not in an engaging state with the splines H1, H2, H3 and H5 of the driven gears, so that the driven gears are freely rotatable with respect to the transmission output shaft. When moving the sleeve in the axial direction, one of the splines H1, H2, H3 and H5 of the driven gears engages with the spline on the sleeve 31 or 32 while the sleeve engages with the hub 41 or 42, so that one of the driven gears or the first input shaft is fixed rotationally to the transmission output shaft.

In the fifth shift stage, the spline H5 for the fifth shift stage engages with the sleeve 32, so that the first input shaft S1 and the transmission output shaft SO are connected to each other through the fifth speed drive gear D5 and the fifth speed driven gear G5 for making the rotational speed of the output shaft SO larger than that of the output shaft SE. Since the second clutch transmits variably the torque from the output shaft SE to the transmission output shaft SO with slipping in the second clutch, the rotational speed of the output shaft SO is made smaller than that of the output shaft SE when the second clutch transmits the torque from the output shaft SE to the transmission output shaft SO. When the fifth speed driven gear G5 is engaged with the sleeve 32 to be rotationally fixed to the output shaft SO through the hub 42 so that the rotational speed of the output shaft SO is made higher than that of the output shaft SE, the torque is prevented by the one-way clutch OWC from being transmitted from the output shaft SE to the output shaft SO so that the output shaft SO is driven only by the torque transmitted by the first clutch C1. Therefore, the change to the fifth shift stage from the fourth shift stage can be smooth, although the second clutch C2 cannot harmonize rotations of the sleeve 32 or hub 42 and the spline H5 and/or rotations of the output shaft SE and the first input shaft S1 as the change to the second shift stage from the first shift stage in the first embodiment.

Figure 8:
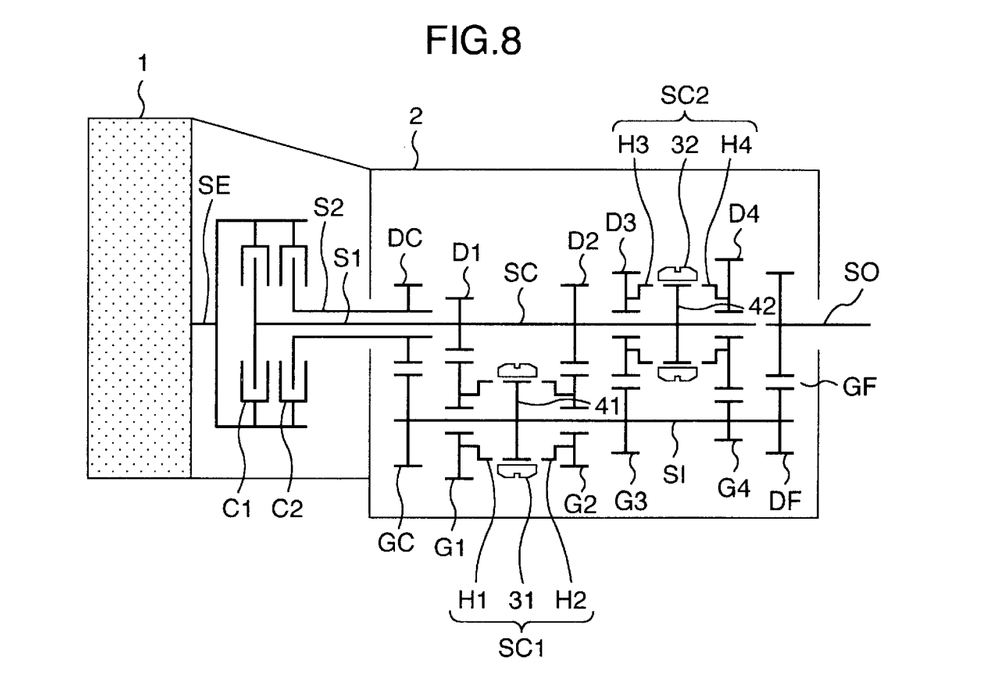
FIG. 8 is a view schematically showing another embodiment of the present invention.

FIG. 8 is a view schematically showing another embodiment of a four-shift-stages transmission as an example of the invention.

In FIG. 8, the second input shaft S2 has a hollow shape, the first input shaft S1 is arranged at a radial inside of the second input shaft S2 or surrounded by the second input shaft S2. The first input shaft S1 is connected to the output shaft through the counter shaft SC, selected one of the pair of gears G1 and D1, the pair of gears G2 and D2, the pair of gears G3 and D3 and the pair of gears G4 and D4, the sleeve 31 or 32, and the hub 41 or 42, and the second input shaft S2 is connected to the output shaft SO through a pair of gears DC and GC mating with each other, an intermediate shaft SI, and a pair of gears DF and GF mating with each other, while the gears G1 and G2 are rotatable on the intermediate shaft SI, the gears D3 and D4 are rotatable on the counter shaft SC, the gears D1 and D2 are fixed to the counter shaft SC, the gears G3 and G4 are fixed to the intermediate shaft SI, the hub 41 is fixed to the intermediate shaft SI, and the hub 42 is fixed to the counter shaft SC.

Figure 9:
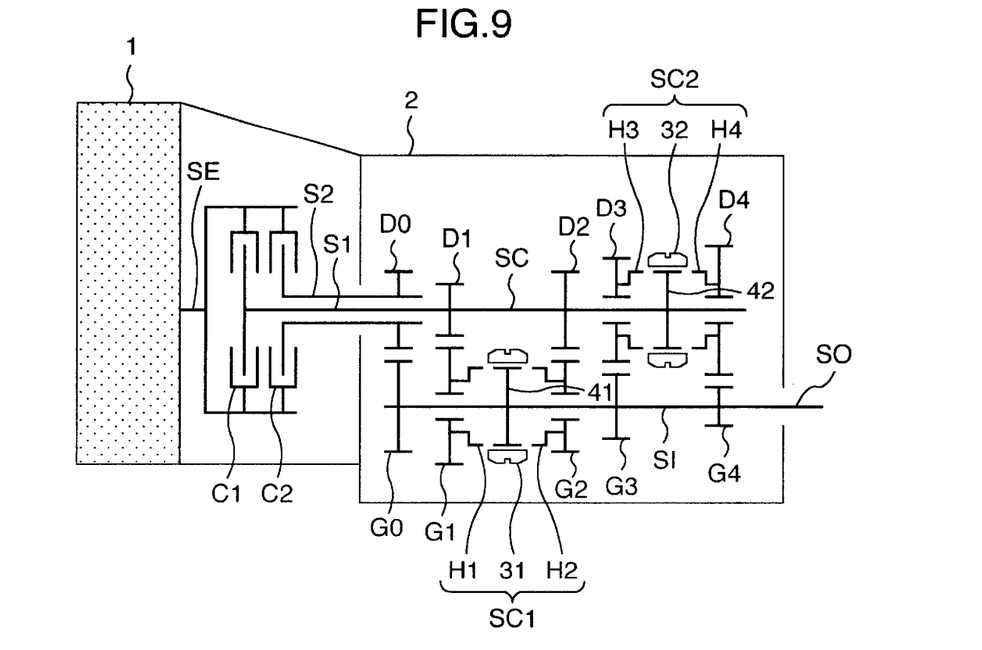
FIG. 9 is a view schematically showing another embodiment of the present invention.

FIG. 9 is a view schematically showing another embodiment of a four-shift-stages transmission as an example of the invention.

In FIG. 9, the first input shaft S1 is connected to the output shaft through the counter shaft SC, selected one of the pair of gears G1 and D1, the pair of gears G2 and D2, the pair of gears G3 and D3 and the pair of gears G4 and D4, the sleeve 31 or 32, and the hub 41 or 42, and the second input shaft S2 is connected to the output shaft SO through the pair of gears DC and GC mating with each other, while the gears G1 and G2 are rotatable on the output shaft SO, the gears D3 and D4 are rotatable on the counter shaft SC, the gears D1 and D2 are fixed to the counter shaft SC, the gears G3 and G4 are fixed to the output shaft SO, the hub 41 is fixed to the output shaft SO, and the hub 42 is fixed to the counter shaft SC.

Figure 10:
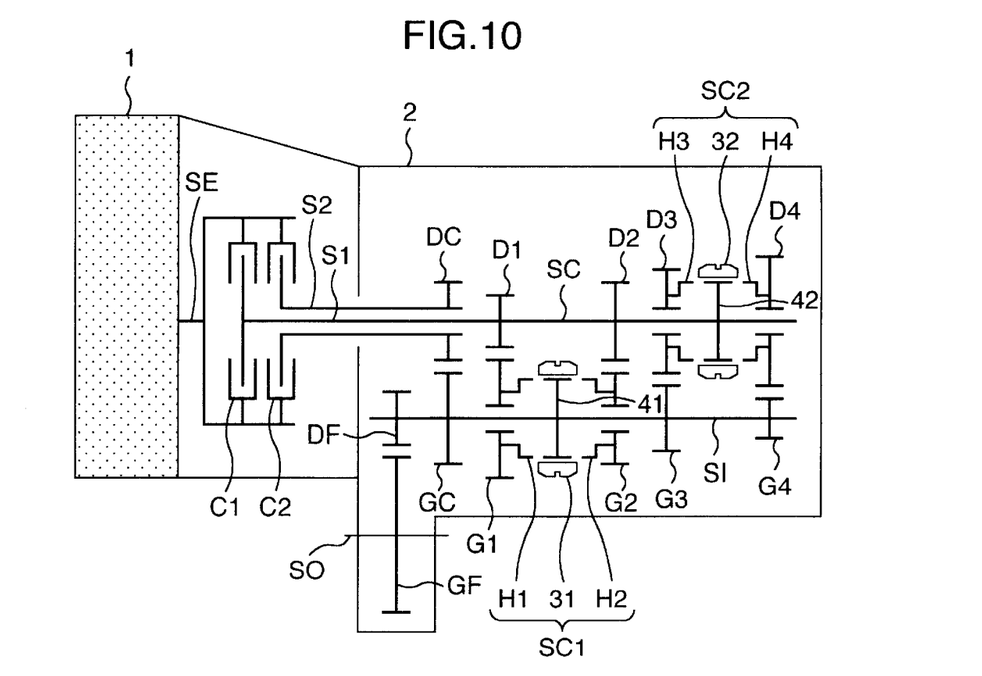
FIG. 10 is a view schematically showing another embodiment of the present invention.

FIG. 10 is a view schematically showing another embodiment of a four-shift-stages transmission as an example of the invention.

In FIG. 10, the first input shaft S1 is connected to the output shaft through the counter shaft SC, selected one of the pair of gears G1 and D1, the pair of gears G2 and D2, the pair of gears G3 and D3 and the pair of gears G4 and D4, the sleeve 31 or 32, and the hub 41 or 42, and the second input shaft S2 is connected to the output shaft SO through the pair of gears DC and GC, the intermediate shaft SI, and the pair of gears DF and GF, while the gears G1 and G2 are rotatable on the intermediate shaft SI, the gears D3 and D4 are rotatable on the counter shaft SC, the gears D1 and D2 are fixed to the counter shaft SC, the gears G3 and G4 are fixed to the intermediate shaft SI, the hub 41 is fixed to the intermediate shaft SI, and the hub 42 is fixed to the counter shaft SC.

What is claimed is:

1. A transmission comprising,
    an input shaft,
    an output shaft, and
    a first clutch including a first upstream rotary member to be driven by the input shaft, and a first downstream rotary member to be driven by the first upstream rotary member and rotationally connected to the output shaft to drive the output shaft and to be driven by the output shaft, wherein the first upstream and downstream rotary members are adapted to be selectively engaged with each other and disengaged from each other,
    wherein further comprising,
        an output shaft driving device for applying a torque to the output shaft at least when the first upstream and downstream rotary members are disengaged from each other, wherein the first upstream and downstream rotary members are disengaged from each other after the torque applied by the output shaft driving device to drive the output shaft is gradually increased.

2. A transmission according to claim 1, wherein the torque transmitted by the output shaft driving device to drive the output shaft is decreased after the first upstream and downstream rotary members are engaged with each other.

3. A transmission according to claim 1, wherein the torque applied by the output shaft driving device to the output shaft is adjusted in such a manner that a difference in rotational speed between the first upstream and downstream rotary members is kept within a predetermined range just before the first upstream and downstream rotary members are engaged with each other.

4. A transmission according to claim 1, wherein the torque applied by the output shaft driving device to the output shaft is adjusted in such a manner that a difference between the torque applied by the output shaft driving device just after the first upstream and downstream rotary members are disengaged from each other and the torque transmitted between the input shaft and the output shaft just before the first upstream and downstream rotary members are disengaged from each other is within a predetermined range.

5. A transmission according to claim 1, further comprising,
    a counter shaft through which the first clutch is rotationally connected to the output shaft to be driven by the input shaft so that the first upstream rotary member is driven by the input shaft and the first downstream rotary member is driven by the first upstream rotary member to drive the output shaft through the counter shaft,
    a pair of first and second gears, the first gear being adapted to be driven by the counter shaft, the second gear being adapted to be driven by the first gear to drive the output shaft, and the first and second gears mating with each other, and
    a second clutch including a second shaft-side rotary member rotationally fixed to one of the counter shaft and the output shaft, and a second gear-side rotary member rotationally fixed to one of the first and second gears in such a manner that the input shaft is permitted to be rotationally connected to the output shaft through the second shaft-side and gear-side rotary members and the pair of first and second gears, wherein the second shaft-side rotary member is adapted to be selectively engaged with the second gear-side rotary member and disengaged from the second gear-side rotary member.

6. A transmission according to claim 5, wherein the torque applied by the output shaft driving device to the output shaft is adjusted in such a manner that a difference in rotational speed between the second shaft-side and gear-side rotary members obtainable when the first upstream and downstream rotary members are engaged with each other is kept within a predetermined range, just before the second shaft-side and gear-side rotary members are engaged with each other.

7. A transmission according to claim 5, wherein the torque applied by the output shaft driving device to the output shaft is adjusted in such a manner that a difference between the torque applied by the output shaft driving device just after the second shaft-side and gear-side rotary members are disengaged from each other and the torque transmitted between the input shaft and the output shaft just before the second shaft-side and gear-side rotary members are disengaged from each other is within a predetermined range.

8. A transmission according to claim 5, wherein the torque applied by the output shaft driving device to the output shaft is adjusted in such a manner that a difference in rotational speed between the first upstream and downstream rotary members obtainable after the second shaft-side rotary member is engaged with the second gear-side rotary member is kept within a predetermined range just before the first upstream and downstream rotary members are engaged with each other.

9. A transmission according to claim 5, wherein the second shaft-side rotary member is disengaged from the second gear-side rotary member after the first upstream and downstream rotary members are disengaged from each other.

10. A transmission according to claim 5, wherein the torque applied by the output shaft driving device to the output shaft is decreased after the first upstream and downstream rotary members are engaged with each other while the second shaft-side rotary member is kept engaged with the second gear-side rotary member.

11. A transmission according to claim 5, further comprising, a pair of third and fourth gears, the third gear being adapted to be driven by the counter shaft, the fourth gear being adapted to be driven by the third gear to drive the output shaft, the third and fourth gears mating with each other, and a reduction gear ratio of the pair of first and second gears being larger than that of the pair of third and fourth gears, and a third clutch including a third shaft-side rotary member rotationally fixed to one of the counter shaft and the output shaft, and a third gear-side rotary member rotationally fixed to one of the third and fourth gears so that the input shaft is rotationally connected to the output shaft through the third shaft-side and gear-side rotary members and the pair of third and fourth gears, wherein the third shaft-side rotary member is adapted to be selectively engaged with the third gear-side rotary member and disengaged from the third gear-side rotary member, and the second clutch and third clutch are cooperative in such a manner that the third shaft-side rotary member is engaged with the third gear-side rotary member when the second shaft-side rotary member is disengaged from the second gear-side rotary member and the third shaft-side rotary member is disengaged from the third gear-side rotary member when the second shaft-side rotary member is engaged with the second gear-side rotary member.

12. A transmission according to claim 11, wherein the torque applied by the output shaft driving device to the output shaft is gradually increased before the third shaft-side rotary member is engaged with the third gear-side rotary member after the second shaft-side rotary member is disengaged from the second gear-side rotary member.

13. A transmission according to claim 11, wherein the torque applied by the output shaft driving device to the output shaft is adjusted in such a manner that a difference in rotational speed between the third shaft-side rotary member and the third gear-side rotary member obtainable when the first upstream and downstream rotary members are engaged with each other is kept within a predetermined range just before the third shaft-side rotary member is engaged with the third gear-side rotary member.

14. A transmission according to claim 11, wherein a peripheral total number of teeth of the third gear is larger than that of the fourth gear of the another pair so that a rotational speed of the output shaft is higher than that of the input shaft, and the output shaft driving device includes a one-way clutch for transmitting the torque when the rotational speed of the output shaft is lower than that of the input shaft and preventing the torque from being transmitted when the rotational speed of the output shaft is higher than that of the input shaft.

15. A transmission according to claim 11, wherein the first upstream and downstream rotary members are engaged temporarily and slightly with each other to decrease a difference in rotational speed between the first upstream and downstream rotary members while increasing the torque applied by the output shaft driving device to the output shaft, before the third shaft-side and gear-side rotary members are engaged with each other after the second shaft-side rotary member is disengaged from the second gear-side rotary member after the first upstream and downstream rotary members are disengaged from each other.

16. A transmission comprising,
an input shaft,
an output shaft, and
a first clutch including a first upstream rotary member to be driven by the input shaft, and a first downstream rotary member to be driven by the first upstream rotary member and rotationally connected to the output shaft to drive the output shaft and to be driven by the output shaft, wherein the first upstream and downstream rotary members are adapted to be selectively engaged with each other and disengaged from each other, wherein further comprising, an output shaft driving device for applying a torque to the output shaft at least when the first upstream and downstream rotary members are disengaged from each other, further comprising, a counter shaft through which the first clutch is rotationally connected to the output shaft to be driven by the input shaft so that the first upstream rotary member is driven by the input shaft and the first downstream rotary member is driven by the first upstream rotary member to drive the output shaft through the counter shaft, a pair of first and second gears, the first gear being adapted to be driven by the counter shaft, the second gear being adapted to be driven by the first gear to drive the output shaft, and the first and second gears mating with each other, and a second clutch including a second shaft-side rotary member rotationally fixed to one of the counter shaft and the output shaft, and a second gear-side rotary member rotationally fixed to one of the first and second gears in such a manner that the input shaft is permitted to be rotationally connected to the output shaft through the second shaft-side and gear-side rotary members and the pair of first and second gears, wherein the second shaft-side rotary member is adapted to be selectively engaged with the second gear-side rotary member and disengaged from the second gear-side rotary member, wherein the torque applied by the output shaft driving device to the output shaft is gradually increased before the second shaft-side rotary member is disengaged from the second gear-side rotary member.

17. A transmission comprising,
an input shaft,
an output shaft, and
a first clutch including a first upstream rotary member to be driven by the input shaft, and a first downstream rotary member to be driven by the first upstream rotary member and rotationally connected to the output shaft to drive the output shaft and to be driven by the output shaft, wherein the first upstream and downstream rotary members are adapted to be selectively engaged with each other and disengaged from each other, wherein further comprising,
an output shaft driving device for applying a torque to the output shaft at least when the first upstream and downstream rotary members are disengaged from each other, further comprising, a counter shaft through which the first clutch is rotationally connected to the output shaft to be driven by the input shaft so that the first upstream rotary member is driven by the input shaft and the first downstream rotary member is driven by the first upstream rotary member to drive the output shaft through the counter shaft, a pair of first and second gears, the first gear being adapted to be driven by the counter shaft, the second gear being adapted to be driven by the first gear to drive the output shaft, and the first and second gears mating with each other, and a second clutch including a second shaft-side rotary member rotationally fixed to one of the counter shaft and the output shaft, and a second gear-side rotary member rotationally fixed to one of the first and second gears in such a manner that the input shaft is permitted to be rotationally connected to the output shaft through the second shaft-side and gear-side rotary members and the pair of first and second gears, wherein the second shaft-side rotary member is adapted to be selectively engaged with the second gear-side rotary member and disengaged from the second gear-side rotary member, wherein the output shaft driving device is rotationally connected to the output shaft without including a gear train between the output shaft driving device and the output shaft.

18. A transmission according to claim 17 wherein the second gear and the output shaft are coaxial.

19. A transmission according to claim 17, wherein the output shaft driving device is one selected from the group consisting of a variable torque transmitter in which a torque transmitting degree therethrough is adjustable, and an electric motor for applying the torque to the output shaft.

* * * * *